Figure 1:
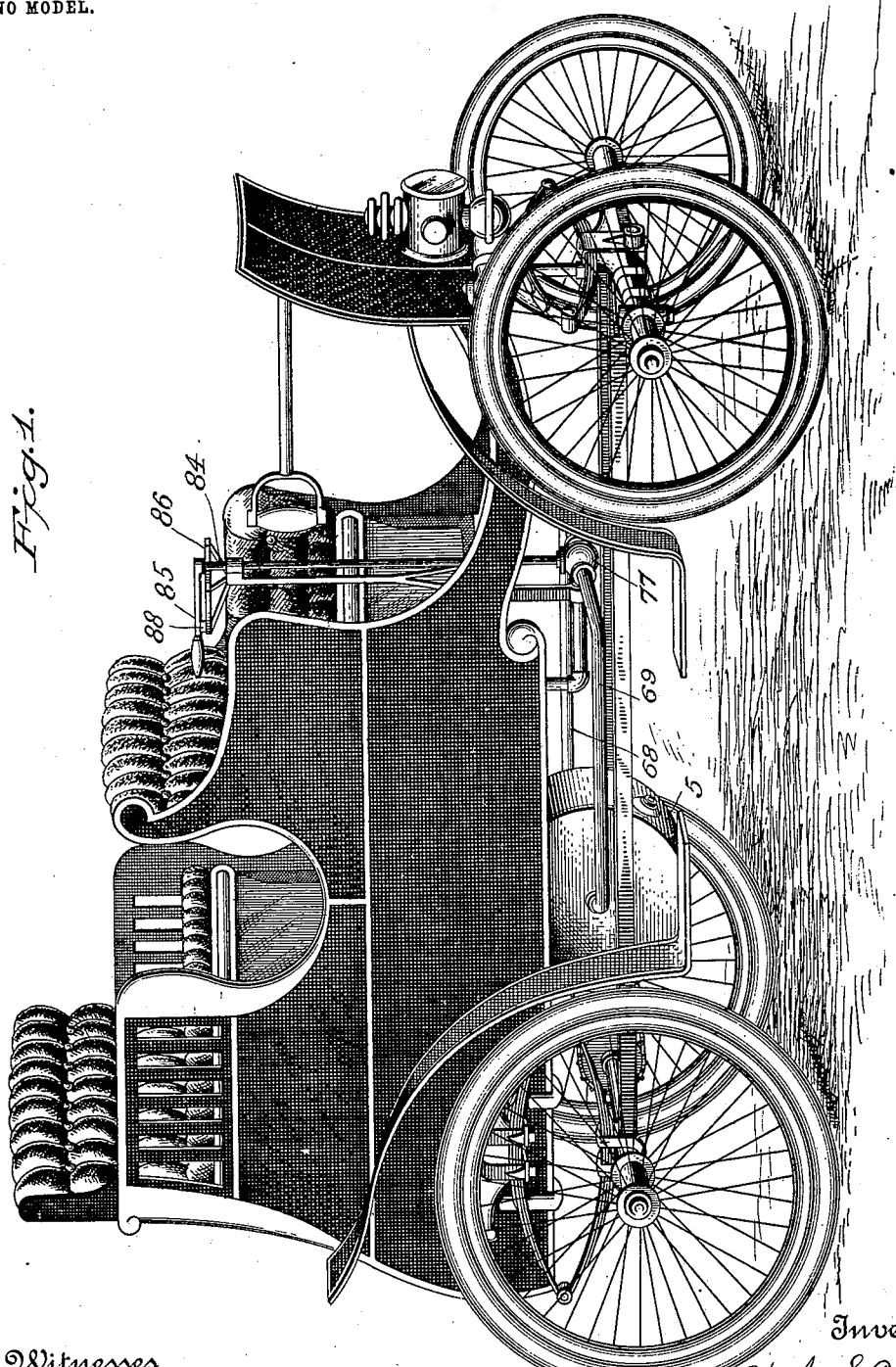

No. 724,380. PATENTED MAR. 31, 1903.
C. S. COLE & W. J. BAULIEU.
MOTOR FOR AUTOMOBILES, &c.
APPLICATION FILED FEB. 17, 1900. RENEWED FEB. 9, 1903.
NO MODEL. 10 SHEETS—SHEET 1.

No. 724,380. PATENTED MAR. 31, 1903.
C. S. COLE & W. J. BAULIEU.
MOTOR FOR AUTOMOBILES, &c.
APPLICATION FILED FEB. 17, 1900. RENEWED FEB. 9, 1903.
NO MODEL. 10 SHEETS—SHEET 3.

Witnesses
G. S. Elliott.
L. C. Hills

Inventors
Charles S. Cole and
William J. Baulieu
By L. Deane
Attorneys

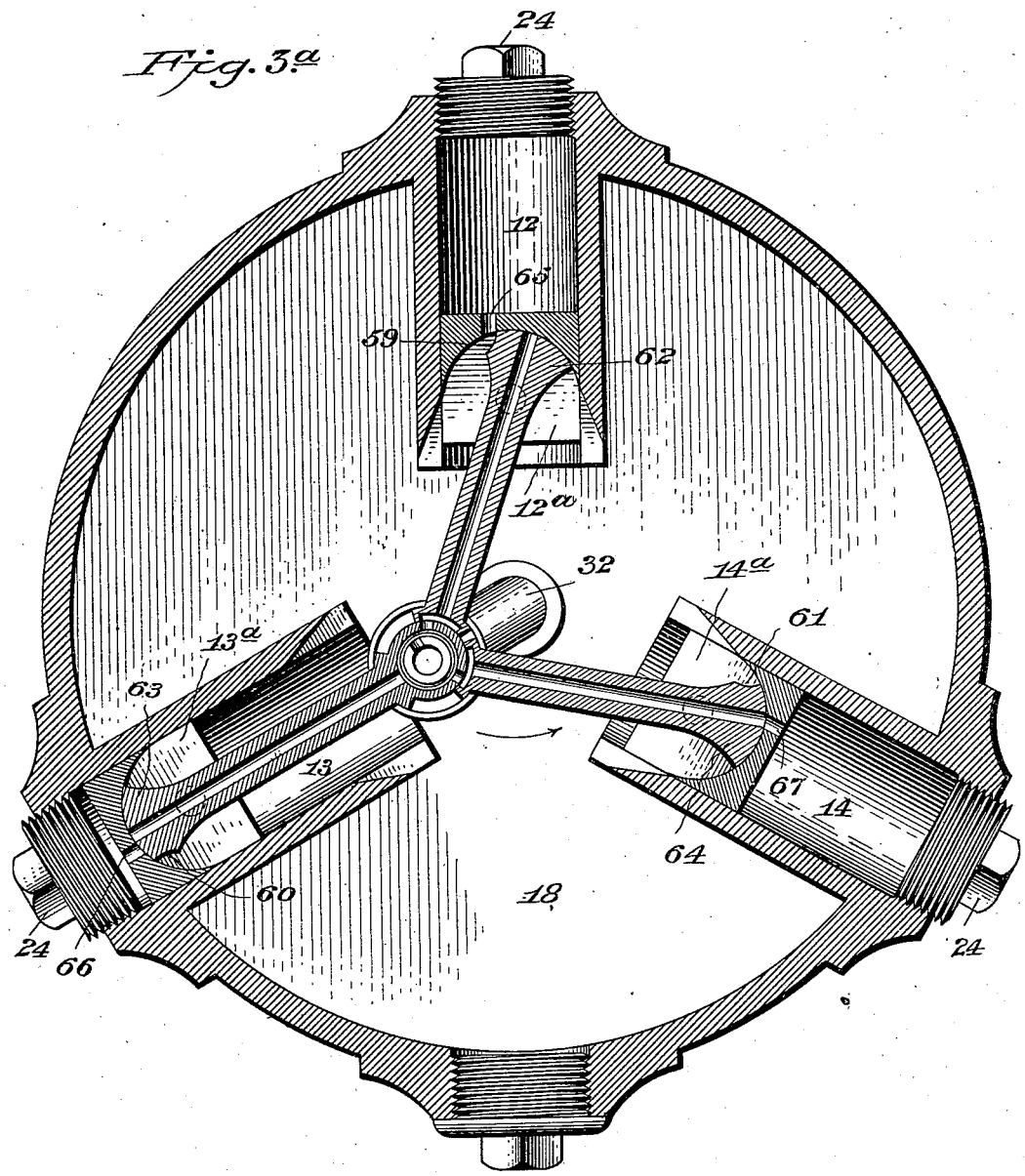

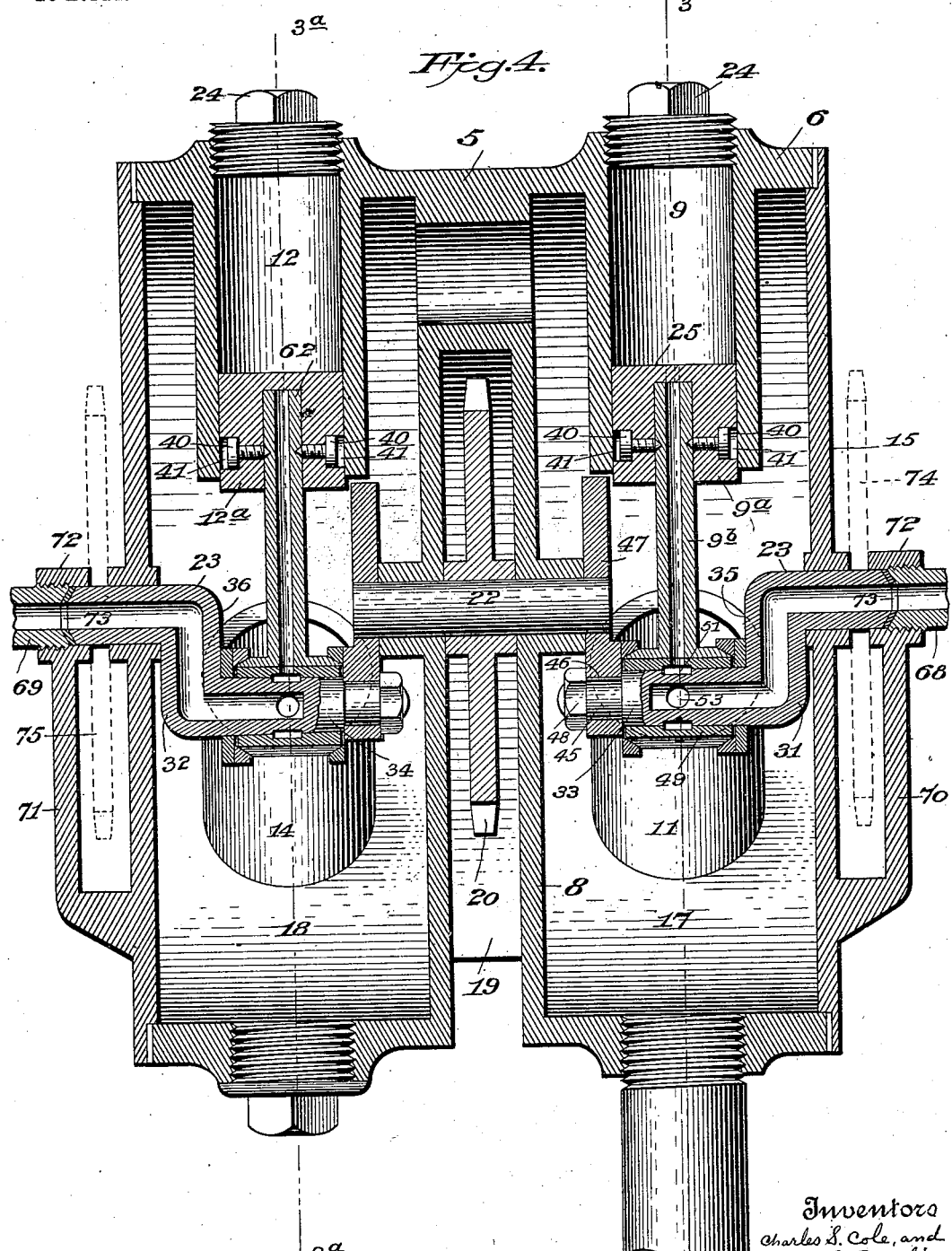

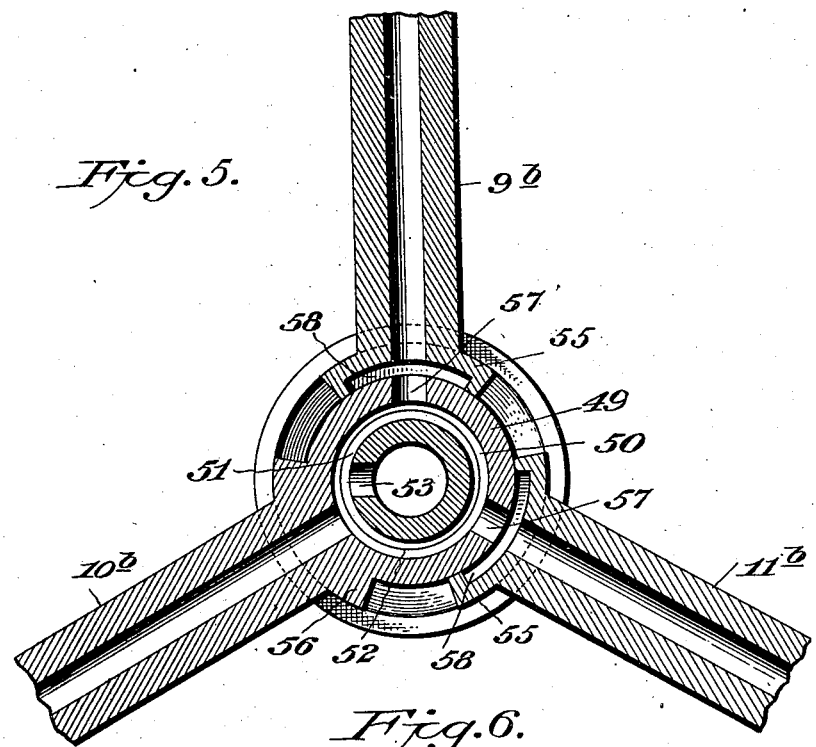
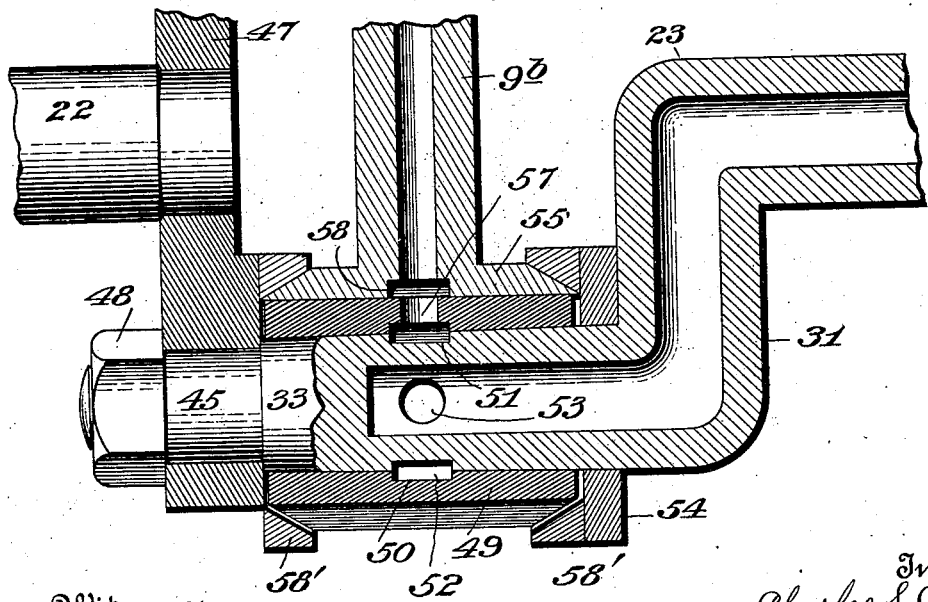

No. 724,380. PATENTED MAR. 31, 1903.
C. S. COLE & W. J. BAULIEU.
MOTOR FOR AUTOMOBILES, &c.
APPLICATION FILED FEB. 17, 1900. RENEWED FEB. 9, 1903.
NO MODEL. 10 SHEETS—SHEET 7.
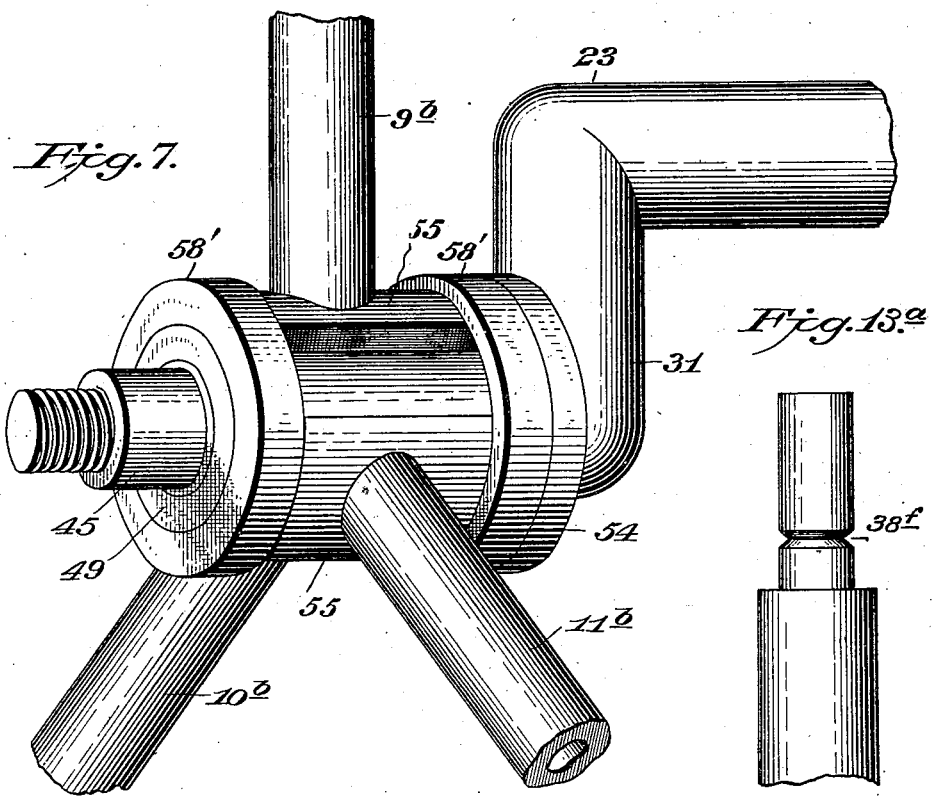
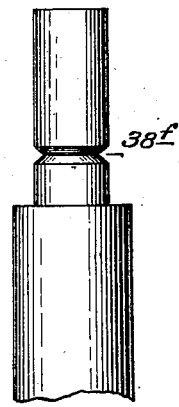
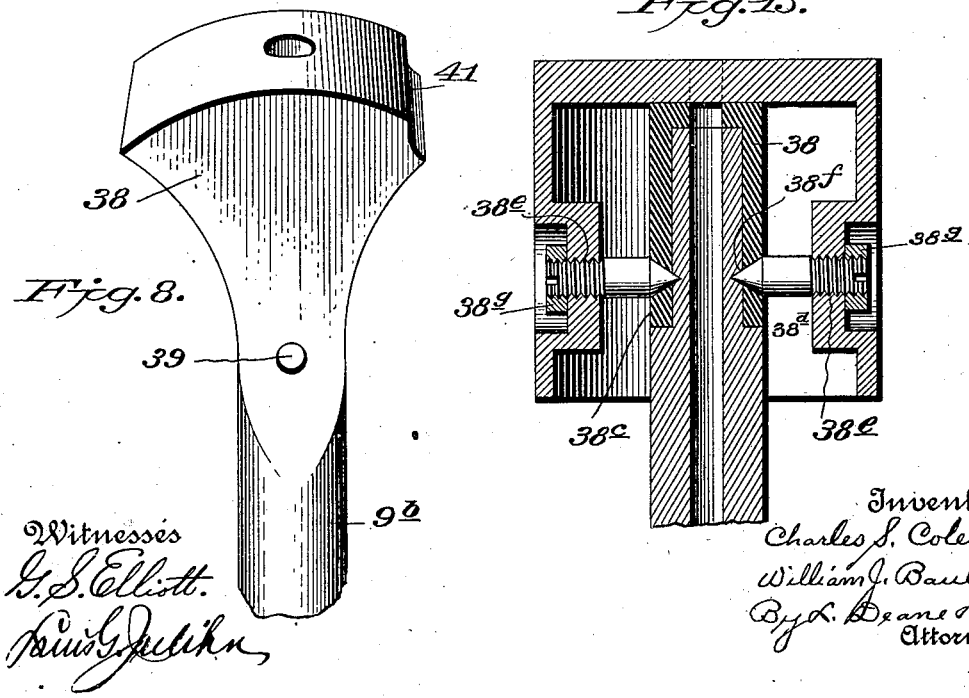

No. 724,380. PATENTED MAR. 31, 1903.
C. S. COLE & W. J. BAULIEU.
MOTOR FOR AUTOMOBILES, &c.
APPLICATION FILED FEB. 17, 1900. RENEWED FEB. 9, 1903.
NO MODEL. 10 SHEETS—SHEET 8.
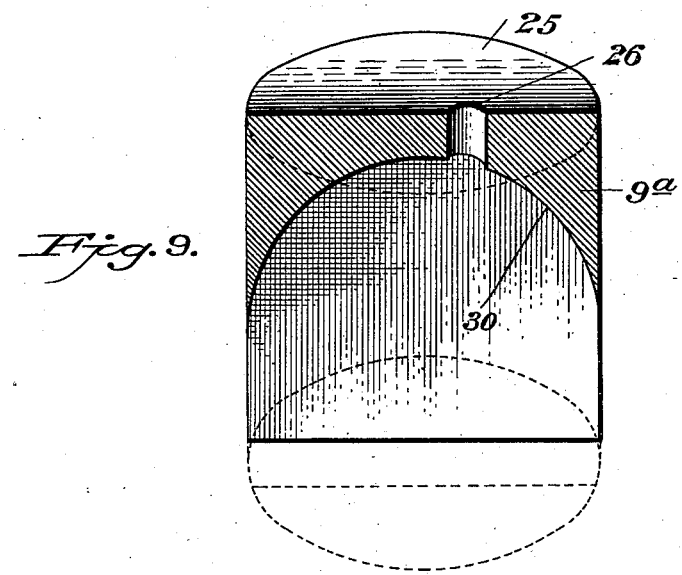
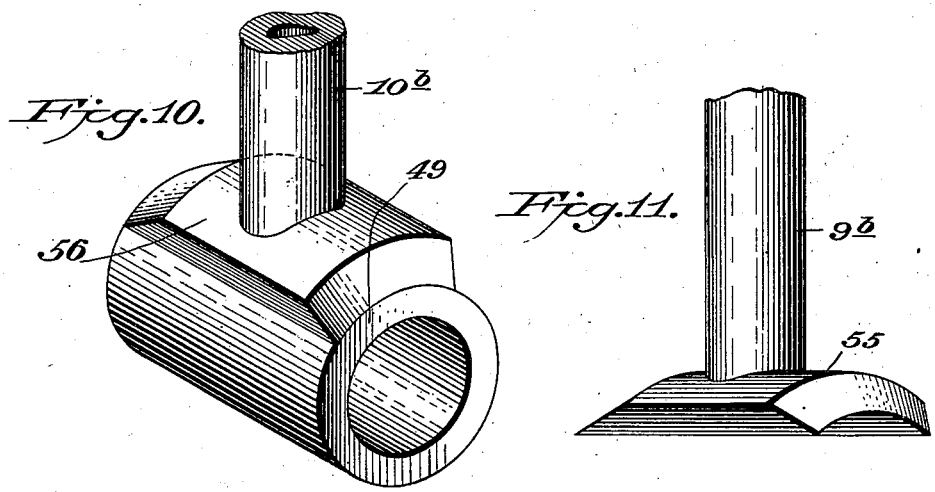
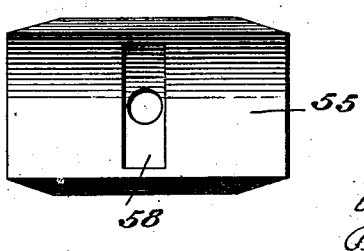
Witnesses
G. S. Elliott.
Louis G. Julihn
Inventors
Charles S. Cole and
William J. Baulieu
By L. Deane & Son
Attorneys No. 724,380. PATENTED MAR. 31, 1903.
C. S. COLE & W. J. BAULIEU.
MOTOR FOR AUTOMOBILES, &c.
APPLICATION FILED FEB. 17, 1900. RENEWED FEB. 9, 1903.
NO MODEL. 10 SHEETS—SHEET 9.
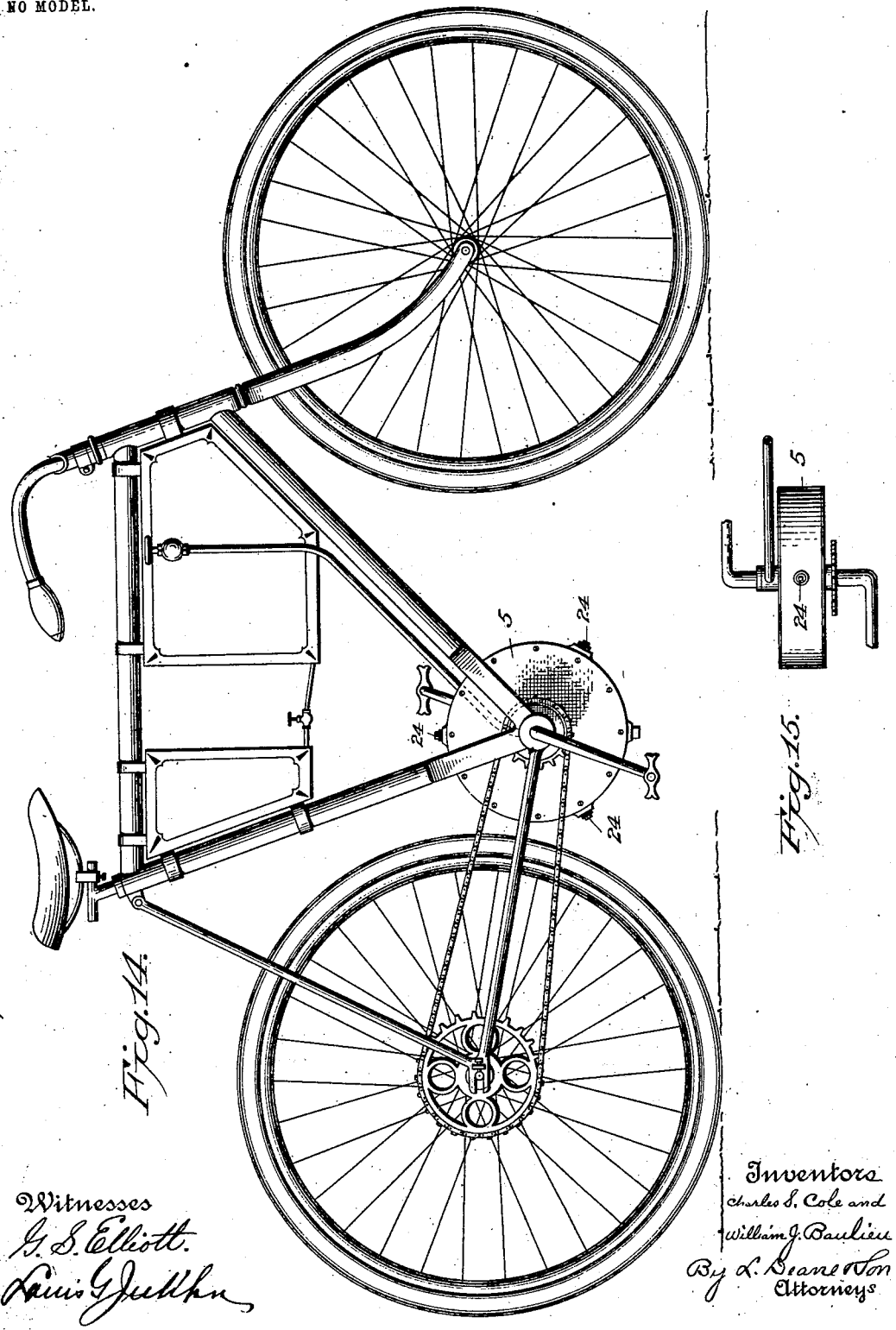
Witnesses
G. S. Elliott.
Inventors
Charles S. Cole and
William J. Baulieu
By L. Deane Son
Attorneys No. 724,380. PATENTED MAR. 31, 1903.
C. S. COLE & W. J. BAULIEU.
MOTOR FOR AUTOMOBILES, &c.
APPLICATION FILED FEB. 17, 1900. RENEWED FEB. 9, 1903.
NO MODEL. 10 SHEETS—SHEET 10.
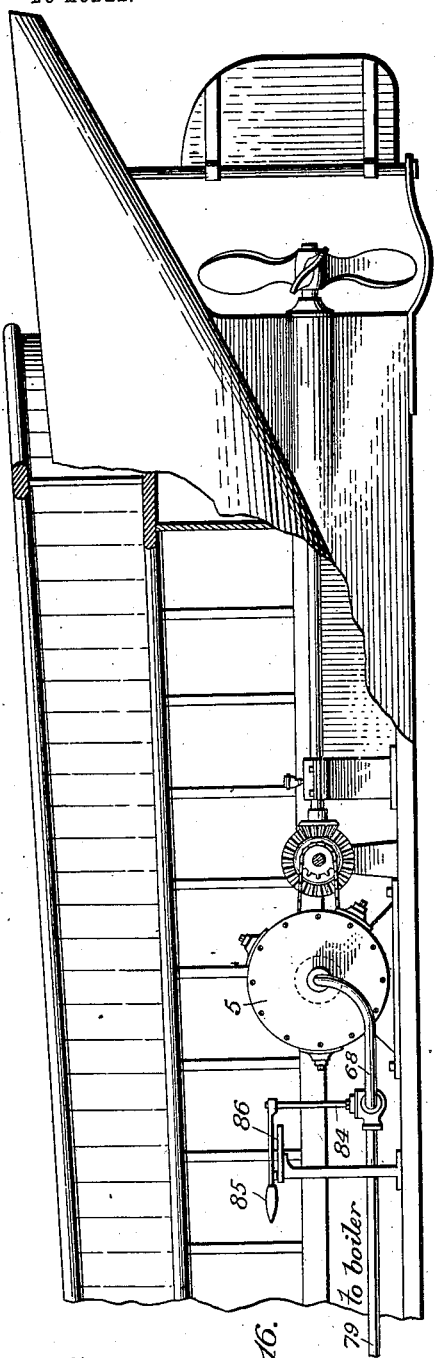
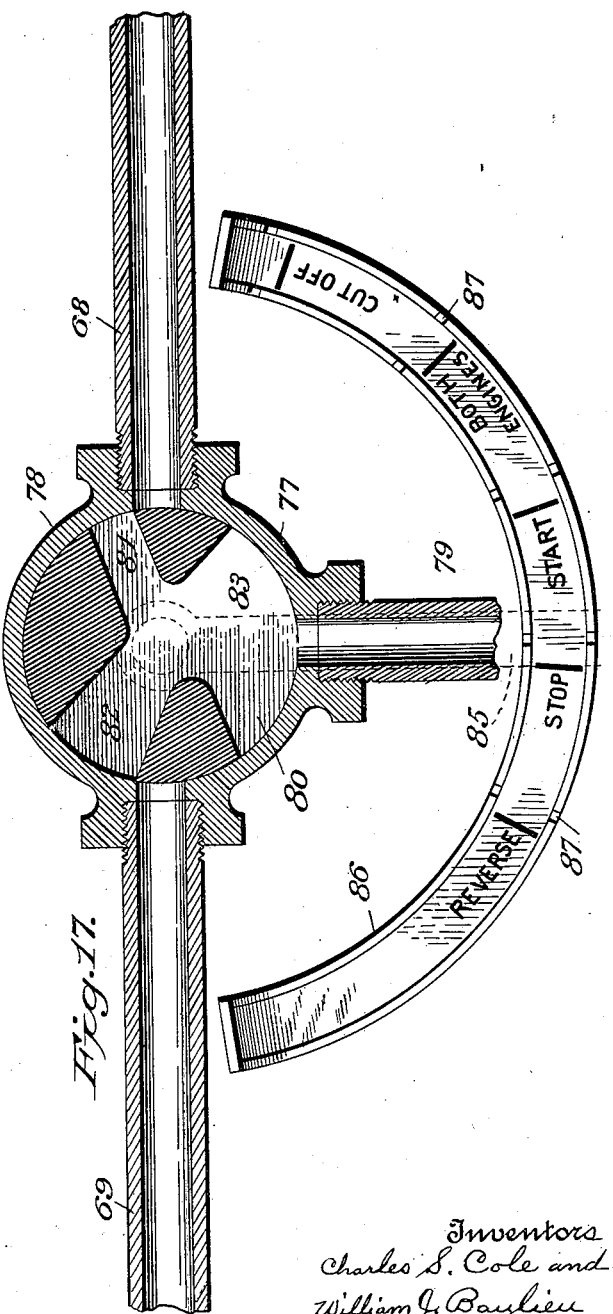
Witnesses
G. S. Elliott.
Louis G. Julihn
Inventors
Charles S. Cole and
William J. Baulieu
By L. Deane & Son
Attorneys

UNITED STATES PATENT OFFICE.

CHARLES S. COLE AND WILLIAM J. BAULIEU, OF BRIDGEPORT, CONNECTICUT; SAID BAULIEU ASSIGNOR TO SAID COLE.

MOTOR FOR AUTOMOBILES, &c.

SPECIFICATION forming part of Letters Patent No. 724,380, dated March 31, 1903.

Application filed February 17, 1900. Renewed February 9, 1903. Serial No. 142,607. (No model.)

*To all whom it may concern:*

Be it known that we, CHARLES S. COLE and WILLIAM J. BAULIEU, citizens of the United States, residing at Bridgeport, in the county of Fairfield and State of Connecticut, have invented certain new and useful Improvements in Motors for Automobiles, &c.; and we do hereby declare the following to be a full, clear, and exact description of the invention, such as will enable others skilled in the art to which it appertains to make and use the same.

Our invention relates to a novel motor designed particularly for use upon vehicles of that class known as "automobiles."

The "automobile," so called, is ordinarily a comparatively light vehicle designed to be propelled over streets and driveways without special provision in the nature of tracks or other road-bed and by means of a motor carried by the vehicle and controlled or operated without special skill or mechanical training on the part of the operator. It follows, therefore, that the ideal motor of this class must be light, compact, durable, easy to operate, and yet of great power. Furthermore, it must be practically noiseless in operation, free from such vibration as would be imparted to the light vehicle-body, incapable of such accidental derangement as would necessitate skilled attention, and, above all, it must be economical in its consumption of fuel and motive fluid to give a maximum range of action to the vehicle, which of necessity can carry but a limited supply of these adjuncts necessary to its locomotion.

The object of our invention is to produce a motor embodying a novel construction and embracing the various requirements specified. To this end the motor, which is of that type known in the art as "multiple-cylinder engines," is composed of a comparatively small cylindrical casing in which are located a plurality of radially-disposed cylinders, within which reciprocate a plurality of pistons connected by oscillating reciprocatory piston-rods directly connected to the crank of a power-shaft, the steam being admitted to the cylinders through the crank, piston-rods, and pistons and exhausted from the cylinders into the interior of the casing for the dual purpose of muffling the sound of the exhaust and of providing steam lubrication for the working parts to reduce the friction incident to their movement, and thereby render the operation of the motor entirely noiseless.

The invention further consists in certain novel details of construction and arrangement rendered necessary to obtain the highest degree of efficiency in a motor of this type.

Figure 2:
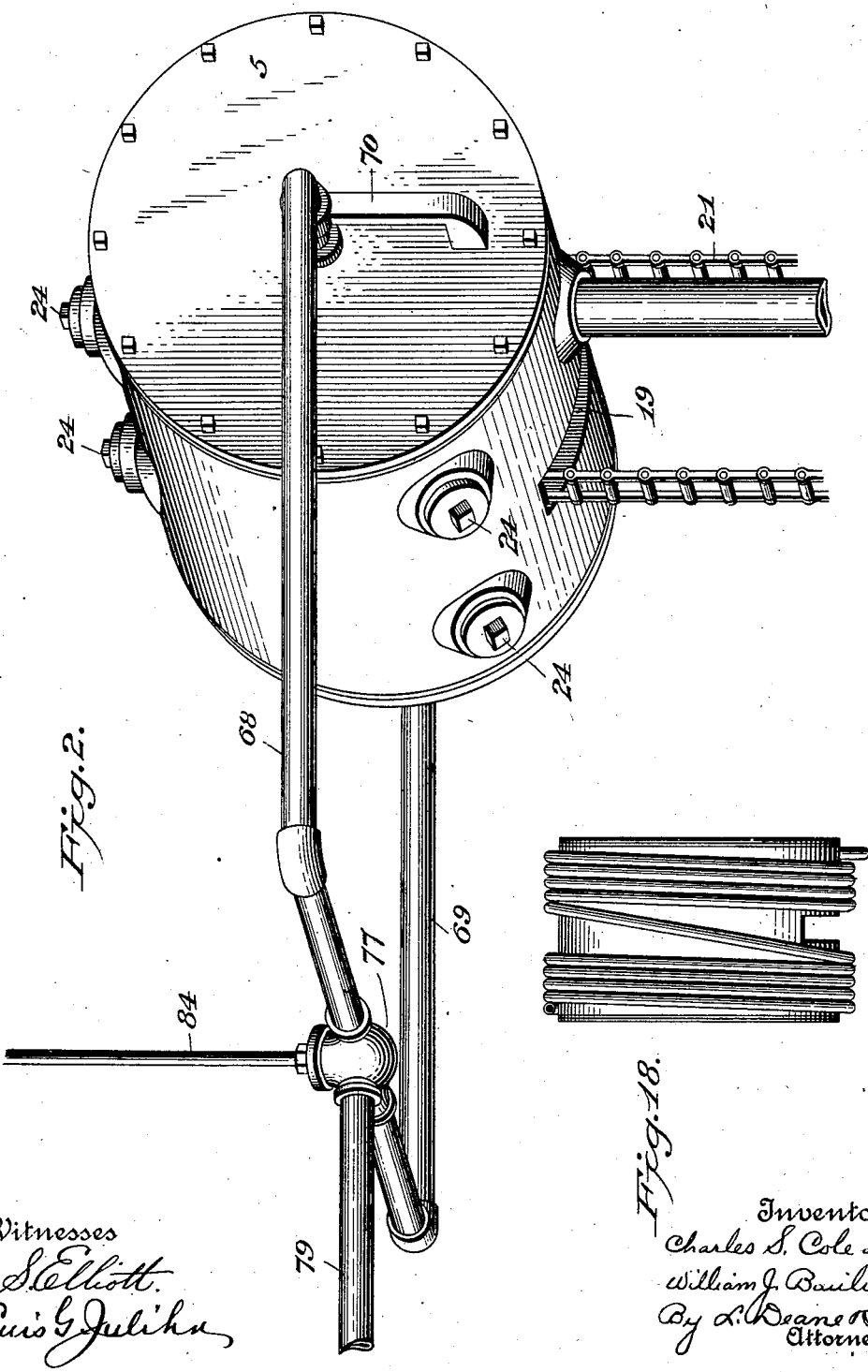
Figure 3:
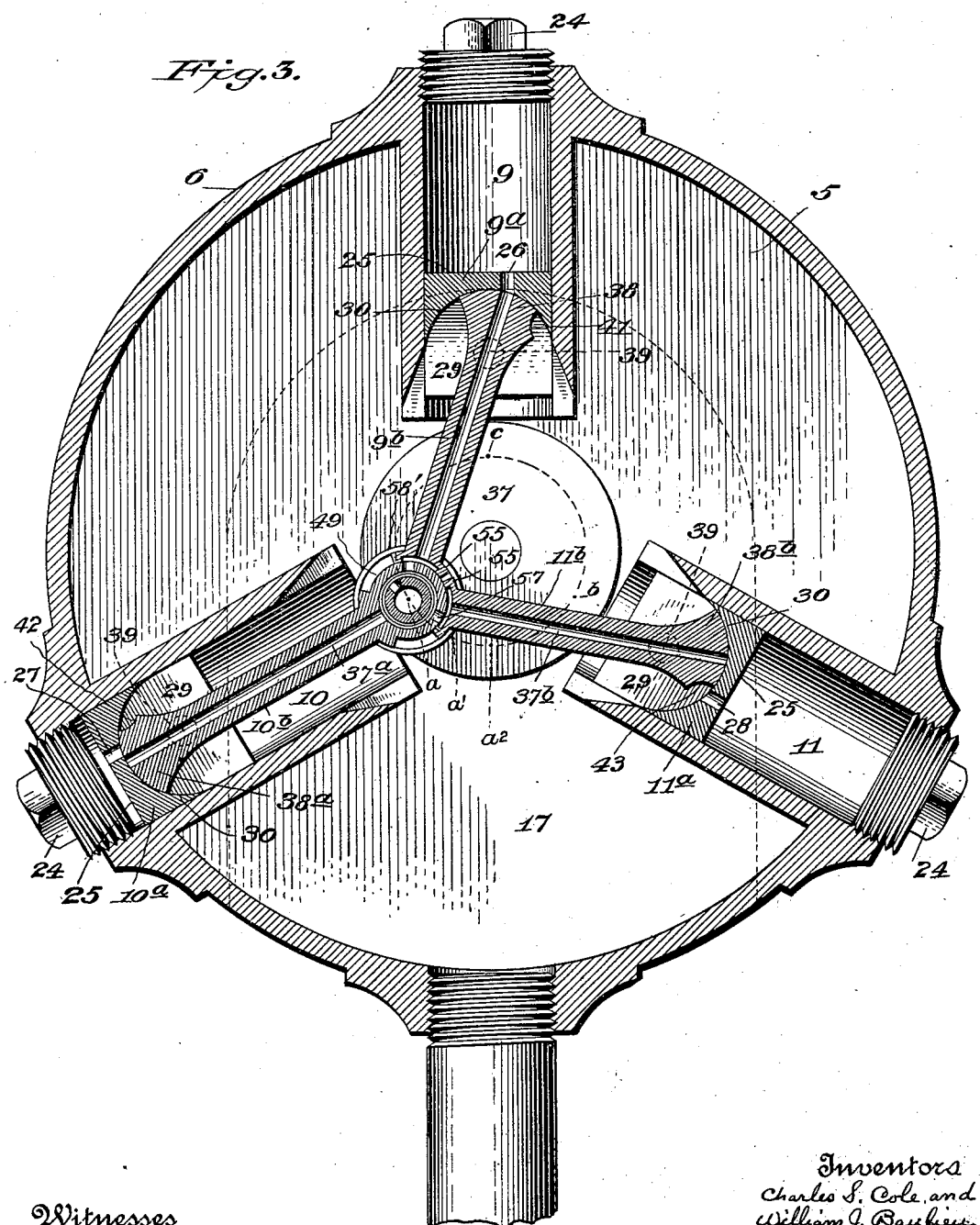

Referring to the accompanying drawings, Figure 1 is a perspective view of an automobile equipped with our device. Fig. 2 is a perspective view of the motor and its gearing detached. Fig. 3 is a sectional elevation of one side of the engine. Fig. 3ª is a similar view of the opposite side. Fig. 4 is a central diametrical section through the motor and its supporting and immediately-connected parts. Fig. 5 is an enlarged sectional view of the crank and the adjacent ends of the piston-rods. Fig. 6 is a similar view at right angles to Fig. 5. Fig. 7 is a detail perspective view of the crank and the connected ends of the piston-rods. Fig. 8 is a detail view of one of the valve-heads. Fig. 9 is a similar view of one of the pistons. Fig. 10 is a detail view of the inner end of the main piston-rod. Fig. 11 is a similar view of one of the other rods. Fig. 12 is a face view of the head 55. Fig. 13 is a sectional view of a modified form of connection between the piston-rods and pistons. Fig. 13ª is a detail view of the valve end of the piston-rod shown in Fig. 13. Fig. 14 is an elevation of a bicycle, showing the application of our motor thereto. Fig. 15 is a detail view, on a small scale, showing the manner of mounting of the motor in connection with a bicycle. Fig. 16 is a general view illustrating the application of our motor to a launch. Fig. 17 is a sectional view of the controlling-valve and connected parts; and Fig. 18 is an elevation of our motor, showing the spiral conduit for the exhaust.

Referring to the numerals of reference indicating corresponding parts in the several views, 1 indicates an automobile, which may be of any desired form, comprising a body 2 and running-gear consisting of wheels 3 and axles 4. The motor 5 is mounted unobtrusively under the body 2 by bolting its casing 6 to a supporting-plate 7, forming a portion of the body floor or platform, or, if preferred, the motor may be mounted within the body of the vehicle upon instead of under the plate 7. The form of the casing is preferably cylindrical, divided by a central disk or partition 8, upon each side of which are formed a series of radial cylinders, preferably three in number, designated by the numerals 9 10 11 and 12 13 14. Casing-heads 15 and 16, bolted or otherwise secured, serve to close the ends of the casing and, with the partition 8, define a pair of internal chambers 17 and 18, each provided with its complement of cylinders. The partition 8 is cast sufficiently thick to permit of the cutting out of a gear-housing 19, extending from the periphery of the casing to a point sufficiently beyond the axis of the partition to permit the mounting of a sprocket or other gear wheel 20 within the housing and upon a solid section 22 of the power-shaft 23, which pierces the partition axially. This gear-wheel 20 is geared, as by a chain or other form of gearing 21, to the rear axle of the vehicle or, if desired, to the hub of each rear wheel, only the former arrangement being shown, however, as these variations of the power-transmitting mechanism are within the province of the mechanic and constitute no essential part of the invention. In this manner the engine or motor is directly geared to the vehicle-wheels, and as it is run in one direction or the other the vehicle will be propelled forward or back at the will of the operator.

Inasmuch as the motor comprises, in effect, a double multiple-cylinder engine, comprehending identically-constructed cylinders and pistons at opposite sides of the central partition and arranged to drive the power-shaft in opposite directions, we will first describe the propelling apparatus located in the chamber 17 of the casing, and will then make reference to such features of the engine within the chamber 18 as may not be identical with those located in the other chamber.

Proceeding to the detailed description of the operative elements of one side of the motor, 24 indicates a threaded plug screwed into the outer end of each cylinder and constituting a removable cylinder-head which when removed permits access to its cylinder from the exterior of the casing. Within the cylinders 9, 10, and 11 are located pistons $9^a$ $10^a$ $11^a$, each having a flat pressure-face 25, pierced by a steam-port 26, 27, or 28, opening into a valve-casing 29, formed by hollowing out each piston from its inner end and grinding its interior face with great nicety to form a concave valve seat or socket 30. The power-shaft 23 is formed within the chambers 17 and 18 with cranks 31 and 32, the wrists 33 and 34 and the crank-bars 35 and 36 of each of which are hollow for the reception of live steam from the hollow outer ends of the power-shaft. To the wrist 33 of the crank 31 within the chamber 17 are connected the inner ends of three reciprocating oscillatory piston-rods $9^b$, $10^b$, and $11^b$, each provided with a longitudinal bore 37, $37^a$, or $37^b$ and an enlarged segmental valve-head 38, $38^a$, or $38^b$, the outer end surface of which latter, in contact with the valve-seat 30, is struck from a center coaxial with the fulcrum 39 of the piston-rod, which in each instance is provided with coaxial transverse studs 40, revoluble in recesses 41 in the side walls of the piston reciprocated by the rod and within which its valve-head is located. An exhaust-port 41, 42, or 43 is formed at one end of each of the valve-heads. Now it will be seen by reference to Fig. 3 of the drawings that as the crank 31 rotates in the direction indicated by the arrows the piston-rods will oscillate from their fulcrums 39, which will alternately present the bores 37 $37^a$ $37^b$ and exhaust-ports 41, 42, and 43 before the ports in the pistons, alternately effecting the supply and exhaust of the steam from the cylinders. The crank, as seen in this figure, is disposed in radial alinement with the cylinder 10, which will locate the piston $10^a$ at the extreme outer limit of its stroke with its port 27 closed and will locate the pistons $9^a$ and $11^a$ at the extreme inner limits of their strokes, but with their valves in reverse relation—that is to say, the port 26 in the piston $9^a$ will be opposite the bore of the piston-rod $9^b$, and the port 28 in the piston $11^a$ will be opposite the exhaust-port 43 in the valve-head $38^b$. In this position of the engine the piston $9^a$, having nearly reached the limit of its pressure-stroke under the impulse of the live steam admitted beyond it through the power-shaft, crank 31, bore 37, and port 41, is ready to have its steam-supply cut off. The cylinder 10 is ready to receive live steam to drive the piston $10^a$ to its inner end, and the piston $11^a$ is ready to be returned with its exhaust-port open to the outer end of the cylinder 11. Now it will be seen that the axis of the wrist 33 is at the rear end of the arc $a\ b$ of its travel and that the directional dimensions of the travel of the inner ends of the piston-rods connected thereto will be coincident with the travel or movement thereof; but it must also be observed that the pistons are only moved to the extent of the diameter of the circular travel of the wrist, all movement of which lateral to the longitudinal axis of the cylinder considered being absorbed by the oscillation of the piston-rod.

Let us consider the operation of the engine from the position given. Moving under the impulse of the piston $9^a$ the wrist-pin will move through the arc $a\ b$, which may be termed the "valve-arc" of the piston-rod $9^b$, because the lateral travel of its lower end through this arc is nearly four times as great as its longitudinal movement and serves to effect an oscillation of the rod sufficient to cut off the supply of steam and open the exhaust-port. As the wrist proceeds from the rear end $a$ of the arc $a\,b$ the piston-rod $9^b$ will be oscillated, which swings the valve-head 38, causing the piston-port 26 to be closed by the disalinement of the bore $37^a$. By preference the parts are so related that the port 26 will be entirely closed shortly before the lower end of the piston-rod $9^b$ reaches the center of the arc $a\,b$, thereby forming an automatic cut-off and permitting the utilization of the expansive force of the occluded steam for the last eighth of the piston-stroke—that is to say, during the movement of the wrist from $a'$ to $a^2$. While the port 26 is being closed, however, the port 27 in the piston $10^a$ is being opened by the apposition of the bore $37^a$, caused by the movement of the lower end of the piston-rod $10^b$ from the point $a$. Thus the pistons $9^a$ and $10^a$ are both under steam-pressure during the travel of the wrist from $a$ to $a^2$, to the end that there is no intermission of activity as the several pistons are brought into use, thus eliminating the vibration which is usually incidental to the operation of a motor and which is particularly objectionable when the motor is carried by a light spring-supported vehicle-body. During the described movements of the wrist and pistons $9^a$ and $10^a$ the piston $11^a$ is being advanced toward the outer end of the cylinder 11, with the exhaust-port 43 opposed to the piston-port 28, which permits the exhaust of the steam into the interior of the casing, where it expands and partially condenses before escaping noiselessly through a short exhaust-pipe 44, piercing the casing at its under side. This pipe may discharge into the open air, or, if preferred, it may communicate with a condenser, from whence the condensation may be returned to the boiler. The wrist will now have reached the point $b$, the cylinder 9 will be exhausting, the supply-valve of the cylinder 10 will begin to cut off, and the valve in the cylinder 11 will begin to take steam, as will be more fully described. It will be understood that this same operation will be repeated as the wrist passes successively through the arcs $a\,b$, $b\,c$, and $c\,a$, with the several cylinders successively taking steam, cutting out, and exhausting.

During the course of the preceding description of construction and operation we have stated that the steam is supplied to the cylinders through the power-shaft, crank, and piston-rods. In order to effect this result, it is necessary to provide for a constant steam-pressure in the several piston-rods at all times to insure prompt feed through the piston-ports as soon as the edge of the bore in each rod passes the edge of the piston-port, as the shaft rotates at a high rate of speed and it is essential that one cylinder must begin to take steam simultaneously with the beginning of the cut-off in the succeeding cylinder in order to insure a constant pressure upon the crank equal at least to a full head of steam in one cylinder. We have therefore devised the construction shown in Figs. 3, 4, 5, and 6 of the drawings for connecting the piston-rods to the wrist in a manner to insure the desired pressure within the rods.

The wrist 33, while it may be formed integral with both the hollow end sections and the solid middle section of the power-shaft, is preferably integral with the adjacent end section and is provided with a solid slightly-tapered reduced end 45, piercing an opening 46 in a crank-wheel 47, keyed or otherwise secured upon the adjacent inner end of the solid shaft-section 22. The extremity of the reduced end is threaded for the reception of a nut 48, screwed against the rear face of the wheel 47.

One of the piston-rods—say, for instance, the rod $10^b$—is provided with a sleeve or hub 49, encircling the wrist and having an internal annular channel 50, coincident with a similar external channel 51 in the face of the wrist, to form an annular steam-chamber 52 in direct communication with the bore $37^a$ and with a port 53, establishing communication with the interior of the wrist. At the end of the hub or sleeve opposite the crank-wheel a backing-ring 54 is fitted tightly upon the wrist, which latter is slightly tapered to permit compensation for wear by screwing up the nut 48. It will now appear that a constant head of steam will be maintained in the steam-chamber 52 and bore $37^a$ ready for immediate escape through the piston-port whenever the latter shall be opened by the movement of the valve-head $38^a$; but it remains to be seen how steam-pressure is maintained in the other piston-rods. This is effected by providing each of the other piston-rods—$9^b$ and $11^b$, for instance—with curved heads 55, longitudinally coextensive with the sleeve 49 and fitting against the exterior thereof, the bearing-surfaces of these parts being ground or otherwise trued to permit of a steam-tight joint. The sleeve 49 is formed with a segmental enlargement 56 at the base of the rod $10^b$, corresponding in general dimensions with the heads 55, the heads and enlargement being of a width to provide sufficient intermediate space to accommodate the oscillations of the several rods. Obviously as the wrist revolves the heads 55 must slide or rock upon the sleeve 49. Therefore in order to maintain a constant pressure within the rods $9^b$ and $11^b$ we provide a pair of radial ports 57 in the sleeve, establishing communication between the chamber 52 and segmental steam-cavities 58, formed in the faces of the heads 55, communicating with the bores 37 and $37^b$ and of sufficient extent to insure their apposition to the ports 57 during the oscillations of the piston-rods.

The ends of the enlargement 56 and heads 55 are oppositely beveled or inclined, as shown, and are encircled by oppositely-disposed clamping-rings 58, having their interior faces correspondingly beveled and backed by the backing-ring 54 and wheel 47, so that by screwing up the nut 48 the wrist is more closely drawn into the sleeve 49 and the clamping-rings are simultaneously urged up the inclined faces of the heads to draw them close against the face of the sleeve to insure at all times perfectly steam-tight joints between these relatively movable elements. If desired, means for lubricating these connections may be incorporated in the structure; but the moisture deposited by the exhaust-steam liberated within the casing and such of the live steam as may penetrate between the bearing-surfaces will ordinarily be found to be effective to insure smooth antifrictional movement of the parts.

It has been stated that the casing contains duplicate propelling mechanisms of substantially identical construction, and by reference to Fig. 4 of the drawings the relation of these duplicate engines will be seen.

In all essential particulars the cylinders 12, 13, and 14 in the casing-chamber 18, as well as their pistons, piston-rods, and mountings, are identical in construction and function with corresponding parts in the chamber 17, the cranks 31 and 32 being disposed in the same radial direction and the cylinders upon opposite sides of the partition 8 being directly opposed. There is one essential difference, however, which is that the exhaust-ports 59, 60, and 61 in the valve-heads 62, 63, and 64 are located at the end of the heads opposite the exhaust-ports in the valve-heads 38, 38$^a$, and 38$^b$, and the piston-ports 65, 66, and 67 in the pistons 12$^a$, 13$^a$, and 14$^a$ are, like the ports 26, 27, and 28, located eccentrically in the pistons, but at the diametrically opposite side of the axial centers thereof. This arrangement constitutes a reversal of the controlling-valves, so that, by way of example, when the cylinder 9 is the active cylinder in the casing 17 or, in other words, is under steam-pressure to drive the crank in the direction indicated by the arrows in Fig. 3 the valve in the cylinder 14 opposite the cylinder 11 will be in position to supply said cylinder with steam to exert an opposite pressure upon the crank 32, and thereby reverse the direction of rotation of the power-shaft. It follows, therefore, that by admitting steam to the proper end of the shaft the engine may be driven or reversed and that by the employment of this construction and arrangement the reversal of the engine can be instantly effected without necessity for the interposition of link-motion or other valve-gearing, the elimination of which is a substantial economy in the cost of manufacture, simplifies the construction, and enables us to inclose the entire assemblage of working parts within the engine-casing out of sight and protected against dust or damp.

Another very important result accruing from the employment of a duplicate engine for the purpose of driving the power-shaft in its reversed direction is that when additional power is desired—for instance, in a mountainous country or when the automobile is intended for use as a freight-carrier or is designed to be otherwise subjected to an unusual load—the capacity of the motor may be doubled by simply removing the casing-head 16, detaching the crank 32, reversing the piston-rods on the wrist 34, and correspondingly turning the pistons 12$^a$, 13$^a$, and 14$^a$ within their cylinders to bring the piston-ports 65, 66, and 67 into positions corresponding to the disposition of the ports 26, 27, and 28 in the pistons 9$^a$, 10$^a$, and 11$^a$. The wrist 34 is then drawn to place by its wear-nut, the head 16 is bolted to place, and steam being admitted to both ends of the shaft both engines or both sides of the engine will be utilized to propel the vehicle.

In Figs. 13 and 13$^a$ we have illustrated a somewhat-modified construction designed to obviate the necessity for disorganizing the engine in order to effect the reversal of the valve-heads 38, 38$^a$, and 38$^b$. In this form the valve-heads instead of being rigid with the valve-rods are formed separately and each is provided with a sleeve 38$^c$, fitting over a reduced end of the piston-rod, to which it is secured by cone-journals 38$^d$, screwed through depressions 38$^e$ in the sides of the piston, having their cones piercing the sleeve and extending into an annular groove 38$^f$ in the face of the reduced end at diametrically opposite points. The journals are adjustably retained by nuts 38$^g$, located within the depressions 38$^e$, and serve both as securing means for the valve-head and as a fulcrum from which the piston-rod may swing. When this construction is employed, the reversal of this side of the engine is effected by removing the cylinder-heads and reversing the pistons and valve-heads simultaneously. This contemplated reorganization will develop the utility of the identical arrangement of the cylinders and cranks in the chambers 17 and 18, as it is essential in motors of this class that any and all adaptations thereof for various contingencies of use must be capable of accomplishment by persons of ordinary intelligence lacking special mechanical skill, and therefore incapable of making mechanical calculations and allowances. It is true, nevertheless, that the motor thus constructed will be economical from the builder's standpoint, as the same engine may be used as a motor for a light reversible vehicle or for a much heavier non-reversible wagon, obviating the necessity for a wide variety of standard sizes of automobile-motors.

This then is a complete description of the motor; but some provision must be made for retaining the steam or other supply pipes 68 and 69 in a manner to permit the steam to pass to the hollow ends of the shaft 23. For this purpose we provide a pair of bearing-brackets 70 and 71, carried by and preferably cast integral with the heads 15 and 16. A journal-box 72 is formed at the end of each bracket for the reception of the hollow ends of the power-shaft, and the steam-pipes 68 and 69 are screwed into these boxes in axial alinement with said shaft. Metallic packing 73 may be interposed between the contiguous ends of the shaft and pipes to insure steam-tight joints, and, if desired, additional gear-wheels 74 and 75 may be keyed upon the power-shaft between the casing-heads and boxes.

We have heretofore referred to the exhaust as passing to a condenser or to the outer air; but while either of these ordinary expedients would undoubtedly be effective in many connections we have made special provision for disposing of the exhaust in a manner involving special utility when the motor is employed in connection with an automobile. This feature comprehends a spiral exhaust-conduit 76, encircling the casing and preferably cast integral therewith, through which the exhaust-steam passes from the interior of the casing. As the steam proceeds through this conduit it prevents cooling of the casing and gradually condenses to such a degree that the noise ordinarily produced by the puffing of the exhaust is entirely eliminated, as is also the steam-jet usually expelled behind the vehicle.

Steam or other motive fluid is generated in a boiler or other generator, and the steam-pipes 68 and 69, leading therefrom to the chambers 17 and 18, are controlled by a suitable valve or valves. It is desirable, however, to employ such steam governing or controlling mechanism as may be operated by a single valve-lever to lead the live steam to either or both sides of the engine or to entirely close the throttle.

In Fig. 17 we have illustrated a novel form of throttle-valve 77, comprising a three-way valve-casing 78, into the connections of which are screwed the ends of the pipes 68 and 69, in axial alinement, and one end of the primary steam-pipe 79 from the generator. Within the casing is mounted, as usual, a revoluble plug 80, having three intercommunicating transverse ports 81, 82, and 83 and an axial valve-stem 84, which preferably extends upwardly into the vehicle, where it is provided with a controlling or throttle lever 85 within convenient reach of the operator and moving over a segmental rack 86, provided with notches 87 for engagement with a spring-latch 88, carried by the lever. These parts are usually of ornamental design and highly polished, and the rack is cast with proper index-marks, designated by the words "Reverse," "Stop," "Start," "Both cylinders," and "Cut off," indicating the position of the valve when the lever 85 is opposite each of the several designations. The ports 81, 82, and 83 are peculiarly related. The port 81 is approximately the diameter of the steam-pipes, one-half the diameter of the port 82, and one-fifth the diameter of the port 83. The solid valve-faces 86 and 87 between the ports 82 and 83 and 81 and 83 are each twice the width of the port 81.

In Fig. 17 the several positions of the ports, according to the location of the controlling-lever, will be seen, and from this it will appear that the manipulation of the single lever will serve to stop, start, or reverse the motor or will lead the steam to both sides of the engine or effect a complete cut-off.

The general operation of our motor is as follows: The operator occupying the seat of the vehicle grasps the adjacent end of the throttle-lever, and the vehicle and its motor are instantly under his complete control. The lever is retained by its latch opposite the word "Stop," appearing in raised letters on the rack, and the solid faces 86 and 87 of the valve are opposed to the pipes 68 and 69. If it is desired to start the vehicle forward, the latch is withdrawn from its notch in the rack and the lever is swung to the right until it is opposite the word "Start." This movement of the lever brings the port 82 opposite the pipe 68 and the solid face 87 opposite the pipe 69, which permits steam to pass from the pipe 79 through the valve and pipe 68 to the engine within the chamber 17, which in the manner heretofore described propels the power-shaft in the forward direction. In order to reverse the engine, the lever is swung to the left to the point marked "Reverse," which brings the port 81 opposite the pipe 69, closing the pipe 68 with the solid face 86 and directing the steam to the engine in the chamber 18, which operates the shaft in the reverse direction, as heretofore described. Now if both sides of the engine are organized to propel the shaft forwardly the lever is normally located opposite the words "Cut off," which brings the face 86 opposite the primary steam-pipe 79 and prevents the passage of steam through the valve, and when it is desired to start the engine the lever is swung to the left to the point marked "Both cylinders," which locates the ports 82 and 81 opposite the pipes 68 and 69, permitting steam to pass to both sides of the engine, it being understood that the port 83 is of such extent that it always remains opposite the pipe 79, except when the lever is at the point marked "Cut off."

From the foregoing it will appear that we have produced a novel motor for automobiles proof against dust or damp, inclosed entirely within a closed casing, embodying a novel device for the elimination of ocular and audible evidence of the exhaust, protected against cooling by a jacket of steam, embodying novel valve mechanism composed solely of the piston-rods and pistons, comprehending provision for a constant head of steam immediately adjacent to the ports leading to the interiors of the cylinders, comprising a reversing-engine or side capable of ready conversion as auxiliary propelling mechanism, of compact, light, and durable construction, and completely controlled or governed as to its steam-feed by a single throttle-valve; but while the present embodiment of the invention appears at this time to be preferable we do not desire to limit ourselves to the precise arrangement and construction illustrated and described, but reserve the right to effect such changes, modifications, and variations as may be suggested by experience and experiment and which may fall properly within the scope of the protection prayed.

Therefore what we claim as new, and desire to secure by Letters Patent, is—

1. A motor comprising a stationary cylinder, a ported piston, a ported shaft, and a hollow piston-rod having its opposite ends relatively movable to the ports respectively of the piston and the shaft.

2. A motor comprising a plurality of stationary cylinders, a piston in each cylinder, a hollow power-shaft, a hollow piston-rod having a movable connection with each piston, and also connected with the hollow shaft, means for maintaining constant communication between the interior of the shaft and the said rods, and means for effecting the supply and exhaust of the motive fluid to and from the cylinders through the oscillation of the piston-rods.

3. A motor comprising a cylinder, a piston, a hollow piston-rod, said piston-rod and the piston having a relative movement independent of the reciprocatory movement, a power-shaft connected to the piston-rod, means for conducting steam through the shaft, rod, and piston, and means for effecting a supply and exhaust to and from the cylinder through the said relative movement of the piston-rod and piston.

4. A motor comprising a stationary cylinder, a piston, an oscillatory hollow piston-rod connected to the piston, a hollow power-shaft having a hollow wrist connected to and communicating with the hollow piston-rod, means controlled by the oscillation of the piston-rod for regulating the supply of a motive fluid to the cylinder, and means for supplying a motive fluid to the interior of the shaft.

5. A motor comprising a stationary cylinder, a piston therein provided with a port and hollowed out to form a valve-casing having a curved valve-socket, a hollow piston-rod fulcrumed adjacent to one end within the valve-casing, a flared valve-head formed upon the piston-rod beyond its fulcrum, in contact with the curved valve-socket and provided with an exhaust-port at one end, a hollow shaft, a crank formed therein and connected to the rod and means for permitting the unrestricted flow of motive fluid from the crank to the interior of the rod during the oscillation of the latter.

6. A motor comprising a plurality of stationary cylinders, a piston in each cylinder, a hollow power-shaft and crank, a hollow piston-rod pivotally connected to each piston and to the crank, means for maintaining constant communication between the interiors of the crank and piston-rods and means for effecting the supply and exhaust of the motive fluid to and from the cylinders, through the oscillation of the pistons.

7. A motor comprising stationary cylinders, a hollow piston-rod in each cylinder, said piston-rod and the piston having a relative movement independent of the reciprocatory movement, a hollow power-shaft, means for maintaining constant communication between the interior of the shaft and said rods and also for limiting the relative movement of said piston-rods, and means for effecting a supply and exhaust to and from the cylinders through the said relative movement of the piston-rods and pistons.

8. A motor comprising a stationary cylinder, piston, hollow power-shaft, crank, and a hollow piston-rod operatively connected to the piston and provided with a sleeve encircling the wrist of the crank and having an internal annular chamber in communication with the interiors of the wrist and piston-rod respectively.

9. In a motor the combination with a hollow wrist, having an external annular groove and a transverse port extending from said groove to the interior of the wrist, of a hollow piston-rod provided with a terminal sleeve encircling the wrist and having an internal annular groove coincident with the groove in the wrist, said piston-rod being provided with a longitudinal bore communicating with the annular chamber formed by the opposed grooves, a cylinder, and a ported piston to which is movably connected the said piston-rod.

10. In a motor the combination with a plurality of hollow piston-rods and a hollow wrist revolubly connected to the contiguous ends of the rods, means for maintaining constant communication between the interiors of the wrist and rods, cylinders, and ported pistons coöperating with said piston-rods.

11. In a motor the combination with a hollow wrist and means for supplying a motive fluid thereto, of a hollow piston-rod provided with a sleeve, a chamber formed intermediate of the sleeve and wrist and communicating with the interiors of the wrist and rod, and a second hollow piston-rod movably connected to the exterior of the sleeve and in constant communication with the chamber.

12. In a motor the combination with a hollow wrist and a hollow piston-rod provided with a terminal sleeve encircling the wrist and provided with an internal annular chamber in communication with the interiors of the wrist and rod, of a second hollow piston-rod provided with a segmental head in contact with the exterior of the sleeve and provided in its face with an elongated cavity in communication with the interior of the rod, and a transverse port through the sleeve opposite said cavity.

13. In a motor the combination with a hollow piston-rod provided with a terminal sleeve having an internal groove and transverse ports, of a plurality of hollow piston-rods provided with heads in contact with the exterior of the sleeve and having elongated cavities in their faces located opposite the ports in the sleeve, and adjustable means for drawing said heads against the sleeve.

14. The combination with a hollow piston-rod provided with a terminal sleeve, and other hollow piston-rods provided with heads in contact with the sleeve, said heads having their ends oppositely inclined, of clamping-rings having their internal faces oppositely inclined, means for urging said rings upon the inclined ends of the heads to draw said heads into close contact with the sleeve, and means for establishing communication between the interiors of the rods and sleeve.

15. The combination with a tapered wrist, a piston-rod provided with a terminal sleeve having a tapered interior, other piston-rods provided with heads slidably connecting the sleeve and having oppositely-inclined ends, clamping-rings encircling the inclined ends of the heads, and means for simultaneously drawing the wrist into the sleeve and urging the clamping-rings upon the inclined ends of the heads.

16. The combination with a power-shaft, apertured crank-wheel and tapered wrist extending through the aperture, of a piston-rod provided with an internally-tapered sleeve encircling the wrist, other piston-rods provided with heads in contact with the sleeve and having oppositely-inclined ends, a backing-ring carried by the wrist, a pair of internally-inclined clamping-rings encircling the ends of the heads and backed by the crank-wheel and backing-ring respectively and a nut screwed upon the end of the wrist projecting beyond the crank-wheel.

17. A motor comprising a power-shaft, having hollow end sections, duplicate engines operatively connected to the shaft, and independent means for supplying a motive fluid from each end section of the shaft to each of said engines.

18. A motor comprising a power-shaft having separate hollow portions, duplicate engines and means for supplying a motive fluid to said engines from the separate hollow portions of the shaft.

19. A motor comprising a casing, a plurality of duplicate engines, reversely-related valve mechanisms controlling the supply of motive fluid to said engines and a hollow power-shaft operatively connected to both engines.

20. A motor comprising a power-shaft, duplicate engines operatively connected thereto, reversely-related valve mechanisms constituting elements of the engines and a hollow shaft common to both engines for supplying motive fluid thereto.

21. A motor comprising a power-shaft formed with a solid middle section, hollow cranks at opposite sides thereof, means for supplying a motive fluid to said cranks, a cylinder opposed to each crank, independent means of communication between the interiors of each crank and its opposed cylinder, a piston within each cylinder, and a piston-rod connecting each piston with a crank.

22. A motor comprising a power-shaft, a cylinder, a piston provided with a port and a piston-rod controlling the port in the piston and connected to the shaft said piston and piston-rod being reversible to effect the rotation of the power-shaft in either direction.

23. A motor comprising a shaft and hollow wrist, a cylinder, a piston therein provided with a port, an oscillatory hollow piston-rod permanently pivotally connected to the piston and having an exhaust-port to one side of the bore in the rod, and means for mounting the piston-rod in a manner to permit its reversal upon the wrist.

24. A motor comprising a casing, a power-shaft, a pair of cranks formed in the shaft within the casing, engine-cylinders within the casing, pistons within the cylinders, a piston-rod connecting each cylinder with one of the cranks, means for supplying a motive fluid to the cylinders from the opposite ends of the shaft, and means for directing the exhaust from the cylinders to the interior of the casing.

25. A motor comprising a casing, a power-shaft, a cylinder and a ported piston, a hollow piston-rod having a movable connection therewith, means for supplying a motive fluid to the cylinder through the piston-rod, and means for exhausting the motive fluid into the interior of the casing.

26. In a motor, the interior engine, a casing entirely enveloping said engine, and a jacket encircling the exterior of the casing, said jacket comprising a convolute conduit about the casing and in communication with the steam-exhaust from the engine.

27. In a motor the combination with a casing provided with a transverse partition hollowed out edgewise from the periphery of the casing to form a gear-housing, a power-shaft located axially within the casing and having a solid middle section passing through the partition, power-transmitting mechanism carried by the shaft within the housing, cylinders and pistons within the chambers defined upon opposite sides of the partition, piston-rods connecting the pistons with the power-shaft and means for leading a motive fluid to the cylinders through the ends of the power-shaft.

28. The combination with a casing provided with a central partition and cylinders and pistons within the casing at opposite sides thereof, of a solid shaft-section piercing the partition, crank-wheels carried at its opposite ends, hollow shaft-sections piercing the ends of the casing and provided with hollow wrists detachably connected to the crank-wheels, and hollow piston-rods connecting the cranks and pistons.

29. The combination with a casing, a power-shaft having hollow ends, cylinders and pistons within the casing, piston-rods connecting the shaft to the pistons, means of communication between the hollow shaft ends and cylinders and means for leading a motive fluid to either or neither end, or to both ends of the shaft as desired.

30. The combination with the engine-casing, and the separate engines therein, each including motive-fluid-supply conduits, of separate supply-pipes leading to opposite sides of the casing and in communication respectively with the conduits of the separate engines, a primary supply-pipe in communication with both of the aforesaid supply-pipes and a valve arranged at the junction of the primary and other supply pipes.

31. The combination with the engine including a cylinder, a piston, a hollow piston-rod, and a hollow shaft in communication with the hollow piston-rod, a bearing-bracket offset from the engine-casing and provided with a journal-box receiving therein the inlet end of the hollow shaft, a supply-pipe also extending into the same journal-box, and means for providing a steam-tight joint between the contiguous ends of the supply-pipe and said hollow shaft.

In testimony whereof we affix our signatures in presence of two witnesses.

CHARLES S. COLE.
WILLIAM J. BAULIEU.

Witnesses:
  CHARLES H. SHANNON,
  CHARLES HOUGH.